US011889470B2

(12) United States Patent
Sangal et al.

(10) Patent No.: US 11,889,470 B2
(45) Date of Patent: Jan. 30, 2024

(54) PAGING OPTIMIZATION

(71) Applicant: Parallel Wireless, Inc., Nashua, NH (US)

(72) Inventors: Sapna Sangal, Bangalore (IN); Krishnaprasad Madathil, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 5 days.

(21) Appl. No.: 17/480,138

(22) Filed: Sep. 20, 2021

(65) Prior Publication Data

US 2022/0095273 A1 Mar. 24, 2022

Related U.S. Application Data

(60) Provisional application No. 63/080,260, filed on Sep. 18, 2020.

(51) Int. Cl.
*H04W 68/02* (2009.01)
*H04W 68/00* (2009.01)
*H04W 74/08* (2009.01)
*H04W 76/19* (2018.01)

(52) U.S. Cl.
CPC ......... *H04W 68/02* (2013.01); *H04W 68/005* (2013.01); *H04W 74/0833* (2013.01); *H04W 76/19* (2018.02)

(58) Field of Classification Search
CPC ... H04W 68/02; H04W 76/19; H04W 68/005; H04W 74/0833

USPC .......................................................... 370/329
See application file for complete search history.

(56) References Cited

U.S. PATENT DOCUMENTS

| | | | |
|---|---|---|---|
| 2016/0277992 A1 | 9/2016 | Cao | |
| 2017/0374585 A1* | 12/2017 | Pradas | H04W 36/0038 |
| 2018/0234890 A1* | 8/2018 | Shih | H04W 60/00 |
| 2019/0104553 A1* | 4/2019 | Johansson | H04W 74/0833 |
| 2019/0313333 A1* | 10/2019 | Kim | H04W 36/0033 |
| 2019/0350033 A1* | 11/2019 | Wu | H04W 76/27 |
| 2020/0037223 A1 | 1/2020 | Cao | |
| 2020/0120477 A1* | 4/2020 | Mildh | H04W 8/08 |
| 2020/0120741 A1* | 4/2020 | Lindheimer | H04W 60/04 |
| 2020/0359191 A1* | 11/2020 | Rugeland | H04W 8/02 |
| 2021/0127445 A1* | 4/2021 | da Silva | H04W 76/27 |
| 2021/0168603 A1* | 6/2021 | Ryoo | H04W 76/27 |
| 2022/0124594 A1* | 4/2022 | Wang | H04W 76/30 |
| 2022/0295540 A1* | 9/2022 | Tsai | H04W 24/08 |

* cited by examiner

*Primary Examiner* — Mark G. Pannell
(74) *Attorney, Agent, or Firm* — Michael Y. Saji; David W. Rouille

(57) ABSTRACT

Methods and systems for providing paging optimization are described. In one embodiment, a method for processing a paging request in a wireless network system includes sending, by a User Equipment, a Physical Random Access Channel (PRACH) preamble; receiving, by the UE, a paging request; receiving, by the UE, a Random Access Response; sending, by the UE, a response with the response having a cause labeled as a paging response in place of an Radio Area Network (RAN)-based Notification Area (RNA) update response; receiving, by the UE, an RRCResume message; sending, by the UE, an RRCResume Complete message; and sending, by the UE, a paging response.

13 Claims, 9 Drawing Sheets

PAGING OPTIMIZATION

CROSS-REFERENCE TO RELATED APPLICATIONS

This application claims priority under 35 U.S.C. § 119(e) to U.S. Provisional Pat. App. No. 63/080,260, filed Sep. 18, 2020, titled "Paging optimization" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. Pat. application. Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US2017-0055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

Existing Paging and Radio Area Network (RAN)-based Notification Area (RNA) update procedure in Radio Resource Control (RRC) Inactive state of a User Equipment (UE) is defined by 3GPP spec 38.300 & 38.304:

The purpose of RNA update procedure is to inform network about the current RAN area. This can be done either periodically on expiry of timer T380 or once RAN area is modified in System Information Block Type 1 (SIB1).

In RRC Inactive state, if UE has to be paged, Core network sends the same to gNB and gNB sends Paging to UE by using I-Radio Network Temporary Identifier (RNTI) as UE ID in the message.

For RNA Update or response for paging, UE need to come to Connected state first and then can trigger the respective message. For coming to connected state, UE triggers Resumption procedure. For this, first UE sends Physical Random Access Channel (PRACH) preamble to gNB. gNB responds back with Random Access Response (RAR) and assigns Up Link (UL) resources. UE sends Resume Request to gNB. gNB responds back with Radio Resource Control (RRC) Resume and UE responds back with RRC Resume Complete.

SUMMARY

In Inactive state of UE, Paging can be initiated using I-RNTI. This will trigger UE to move to Connected state first using Resumption procedure and then send paging response. UE also can trigger Resumption procedure for sending Periodic RNA update to network. If collision happens at UE i.e. Resumption initiated for RNA Update and at the same time paging with I_RNTI is received, UE might not be able to handle the paging message, as it has already initiated resumption procedure.

In one embodiment a wireless network system providing paging optimization includes a User Equipment (UE); a gNB in communication with the UE; and a core network in communication with the gNB; wherein when an RRCResume request is received by the gNB from the UE before transmission of the paging request, the gNB stores the paging message and processes the paging message after completion of an Radio Area Network (RAN)-based Notification Area (RNA) update.

In another example embodiment a method for processing a paging request in a wireless network system includes sending, by a User Equipment, a Physical Random Access Channel (PRACH) preamble; receiving, by the UE, a paging request; receiving, by the UE, a Random Access Response; sending, by the UE, a response with the response having a cause labeled as a paging response in place of an Radio Area Network (RAN)-based Notification Area (RNA) update response; receiving, by the UE, an RRCResume message; sending, by the UE, an RRCResume Complete message; and sending, by the UE, a paging response.

In another example embodiment, a method for processing a paging request in a wireless network system includes performing, by the UE, a Radio Area Network (RAN)-based Notification Area (RNA) update; sending, by a User Equipment, a Physical Random Access Channel (PRACH) preamble; receiving, by the UE, a Random Access Response; sending, by the UE, a response with the response having a cause labeled as a paging response in place of an Radio Area Network (RAN)-based Notification Area (RNA) update response; receiving, by the UE, an RRCResume message; receiving, by the UE, a paging request during an RNA update; sending, by the UE, an RRCResume Complete message; and sending, by the UE, a paging response.

DETAILED DESCRIPTION

Figure 1:
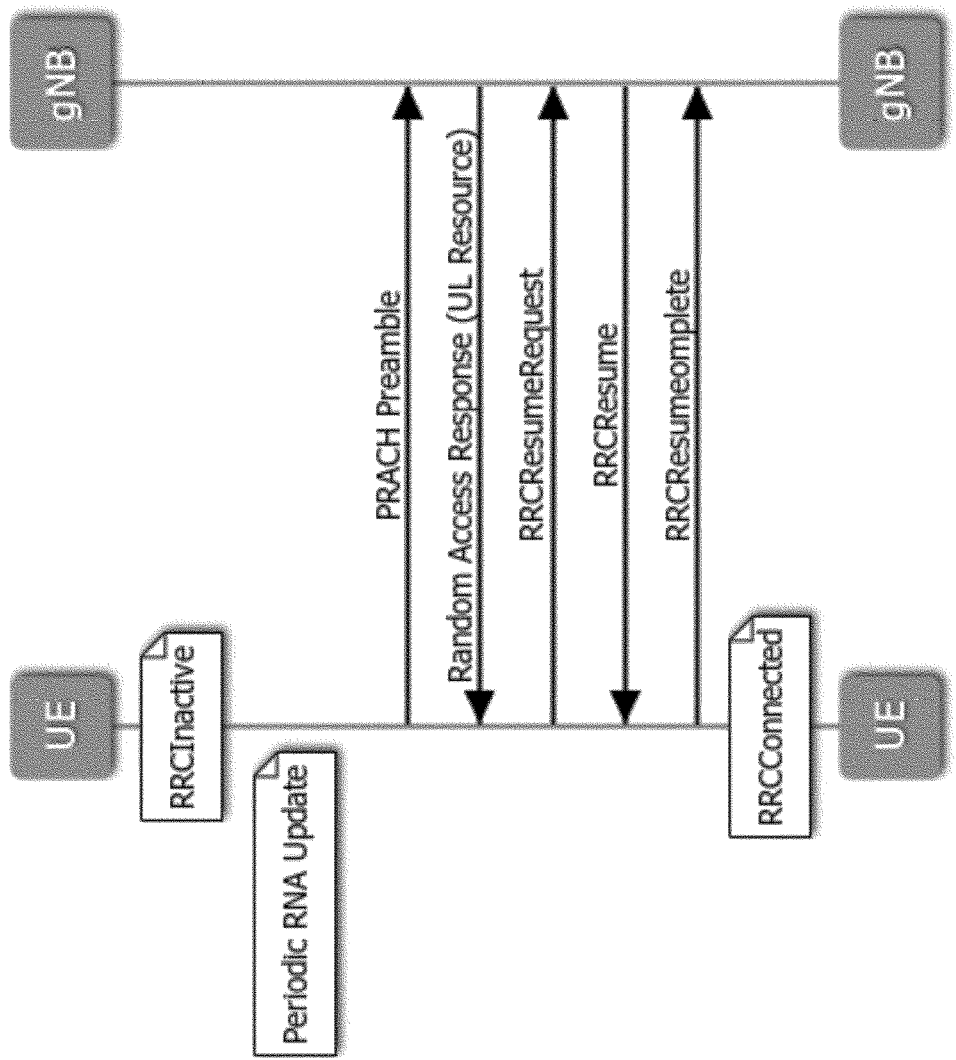
FIG. 1 is a call flow showing a periodic RNA update.
Figure 2:
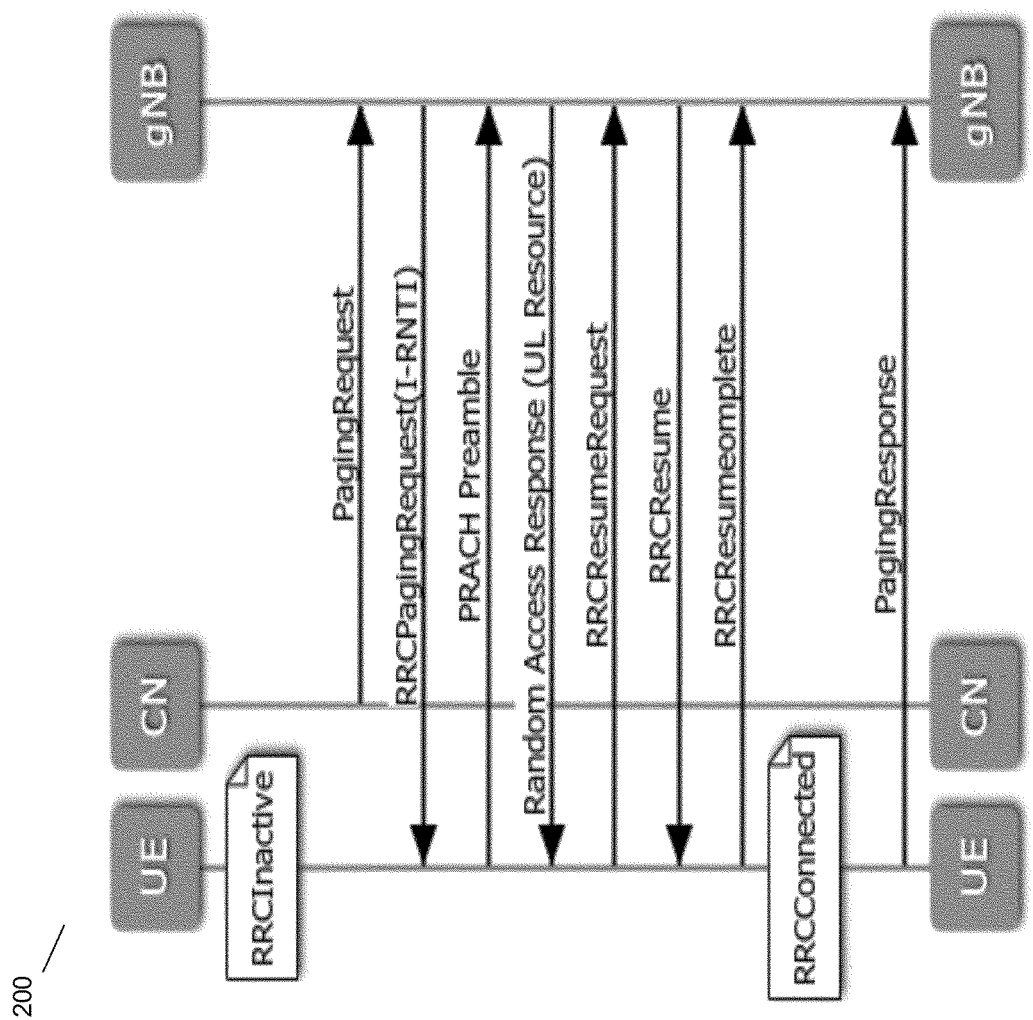
FIG. 2 is a call flow showing a paging procedure.

FIG. 1 and FIG. 2 show a Periodic RNA update 100 and a paging procedure 200. The UE decides to trigger RNA update and sends PRACH preamble to get the resources for sending RRCResumeRequest message. Before transmission of the same, if UE receives Paging message, UE will either drop the paging message or will complete the RNA update procedure first. It is not clearly mentioned in the spec, how will the paging be handled after RNA update.

Figure 3:
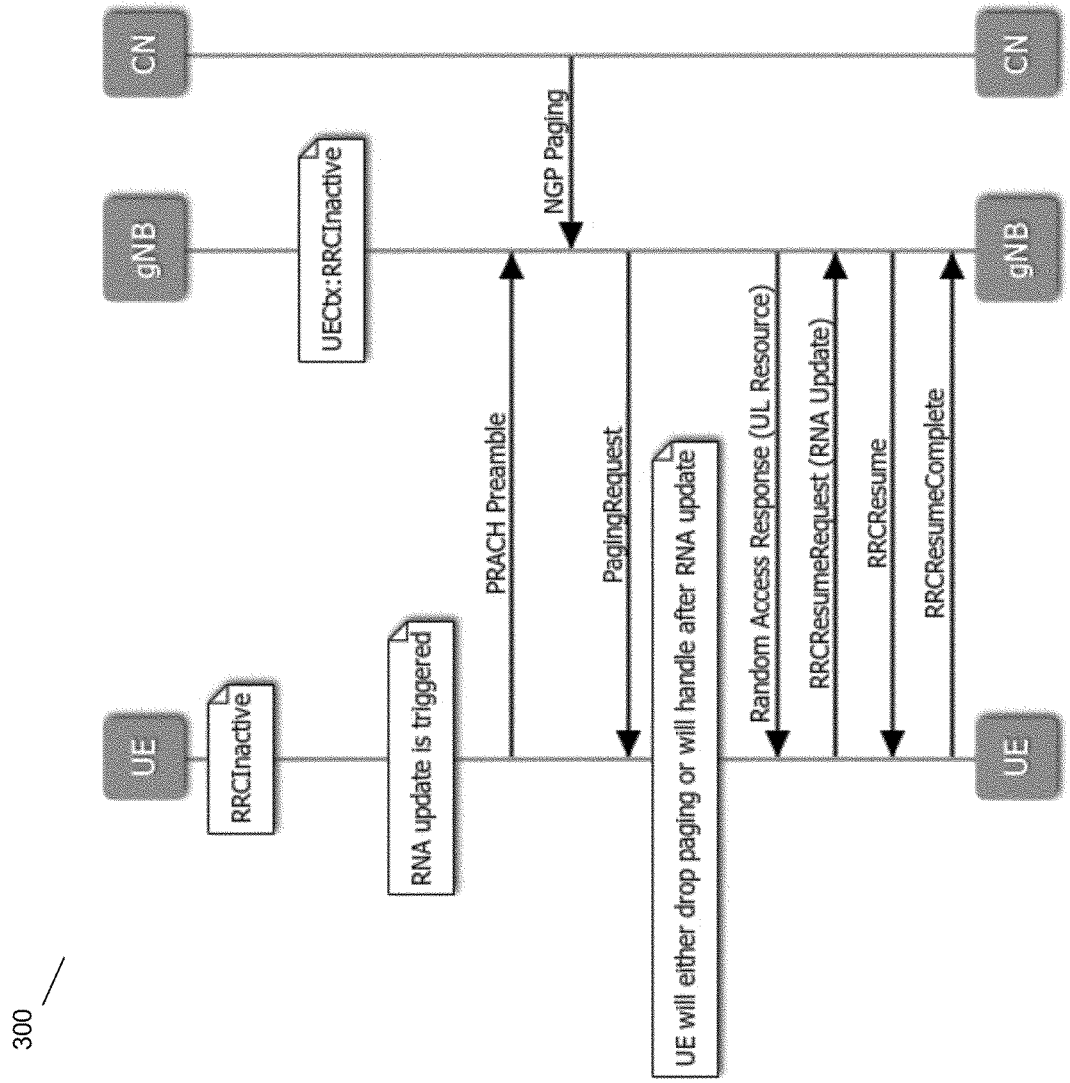
FIG. 3 is a call flow showing a paging procedure during an RNA update.

FIG. 3 is a call flow 300 showing paging during RNA update 300.

Figure 4:
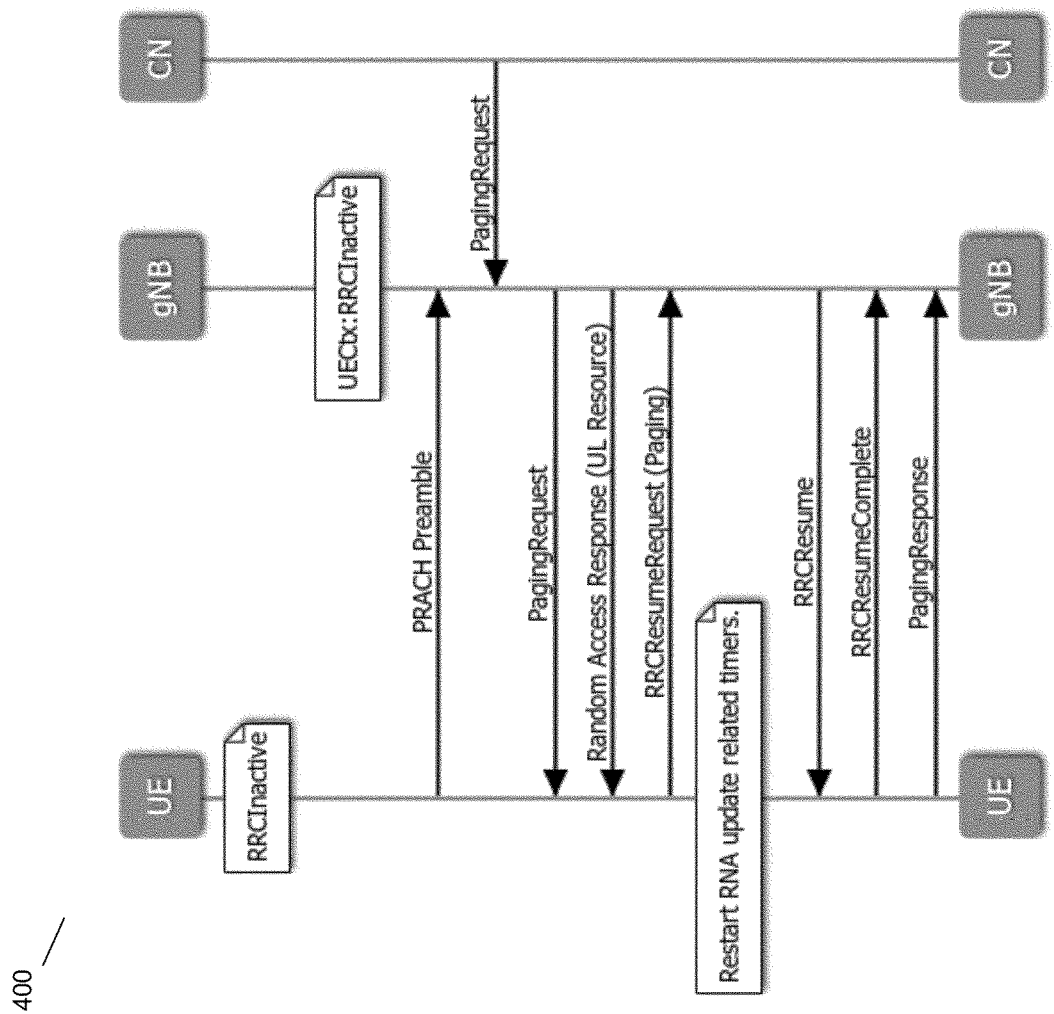
FIG. 4 is a call flow showing a triggering of an RRCResumeRequest causing a paging response, in accordance with some embodiments.

FIG. 4 shows a call flow 400 addressing the problem of having a paging request during an RNA update. This can be handled in UE by triggering RRCResumeRequest with cause as "Paging Response" instead of RNA update even though initial RACH was triggered for the RNA update. All the timers related to RNA update will be restarted.

Figure 5:
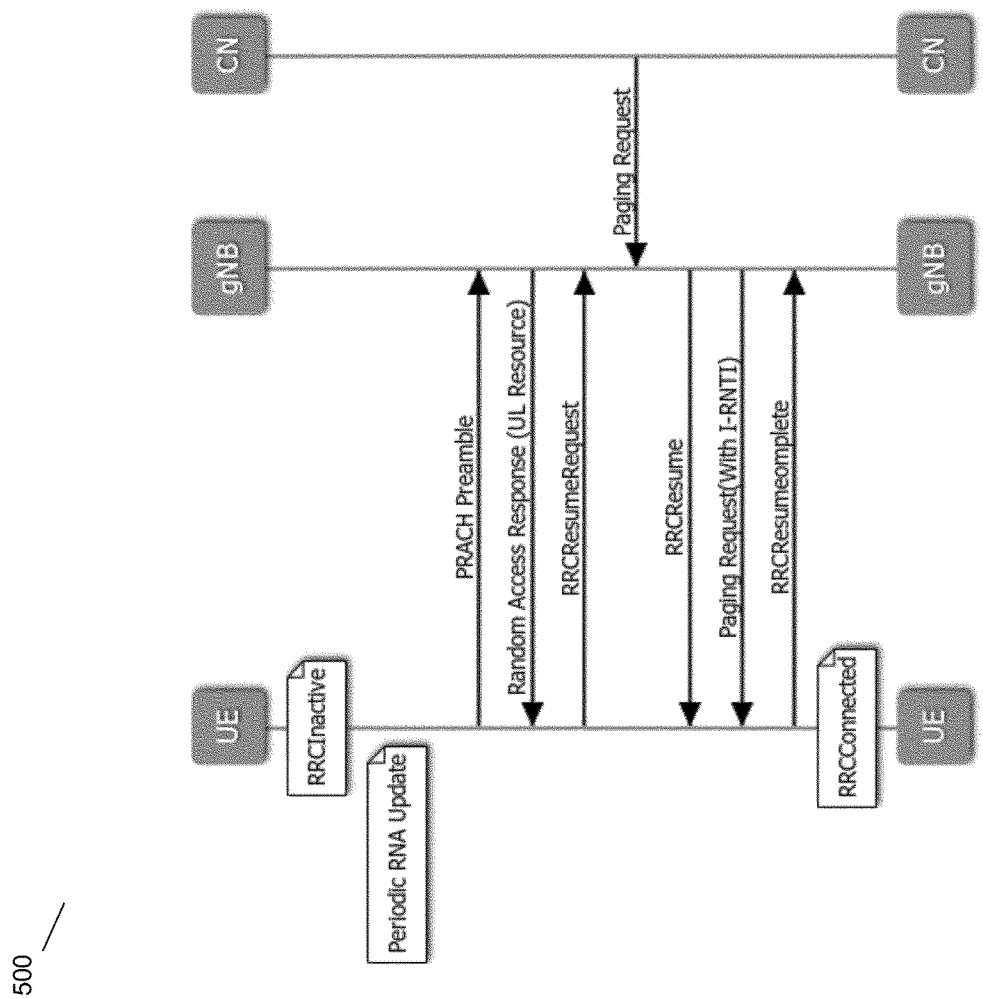
FIG. 5 is a call flow showing a collision of an RNA update and a paging procedure, in accordance with some embodiments.
Figure 6:
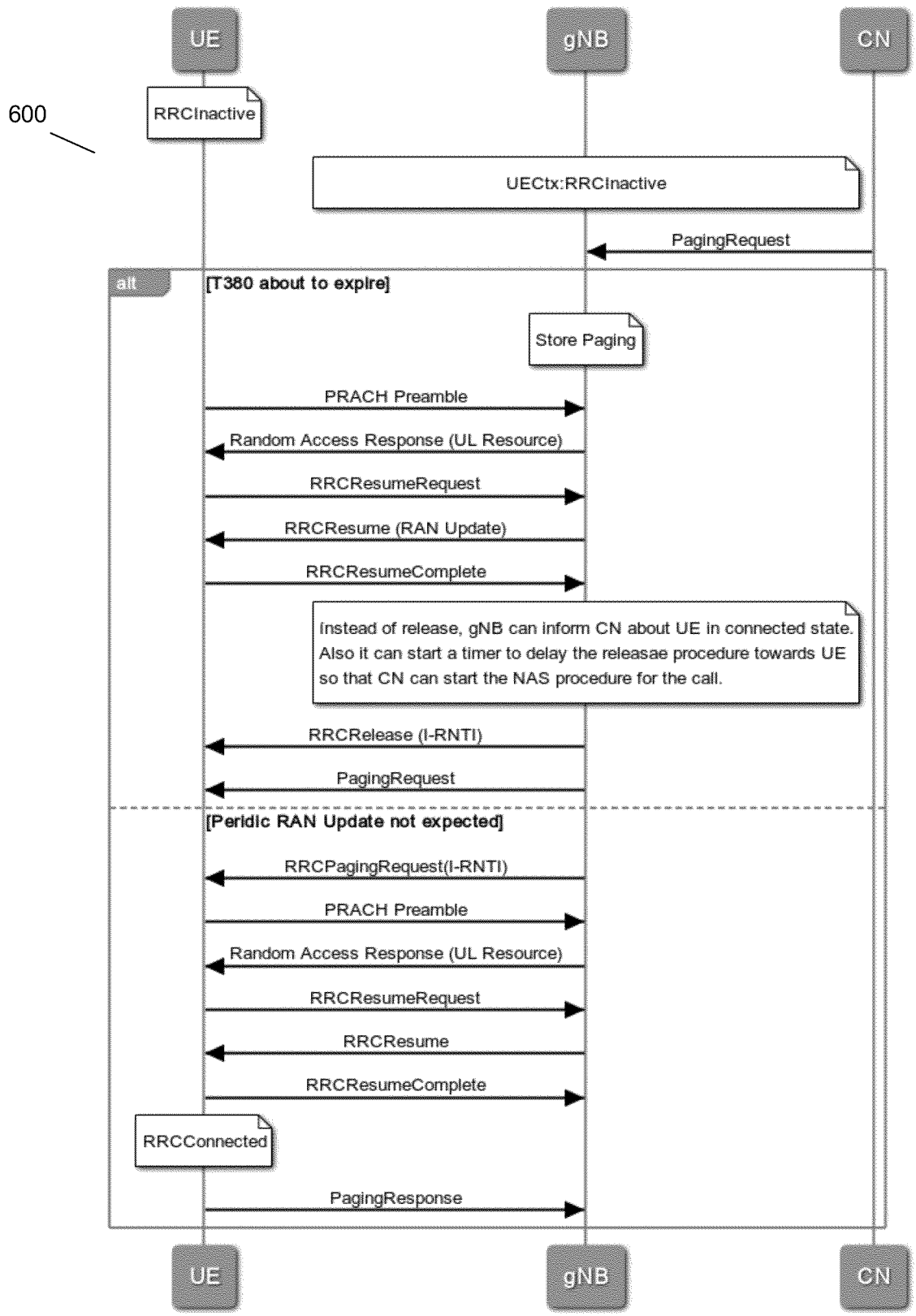
FIG. 6 is a call flow showing storing of a paging message and processing it after completion of an RNA update, in accordance with some embodiments.

FIG. 5 and FIG. 6 shows a call flow 500 and 600 which shows how this problem is handled. This problem can be solved by gNB storing the paging message instead of sending to UE if timer T380 is about to expire. T380 is configured by gNB in RRCRelease message for periodic RNA Update. Once RNA Update procedure is completed successfully, gNB shall send Paging failure to NGAP with the cause.

If T380 timer is about to expire or if RRCResumeRequest is received before transmission of Paging request, gNB shall store the paging message and process it only after completion of RNA update.

The present invention can be used to handle collisions of RNA updates and paging updates.

Figure 7:
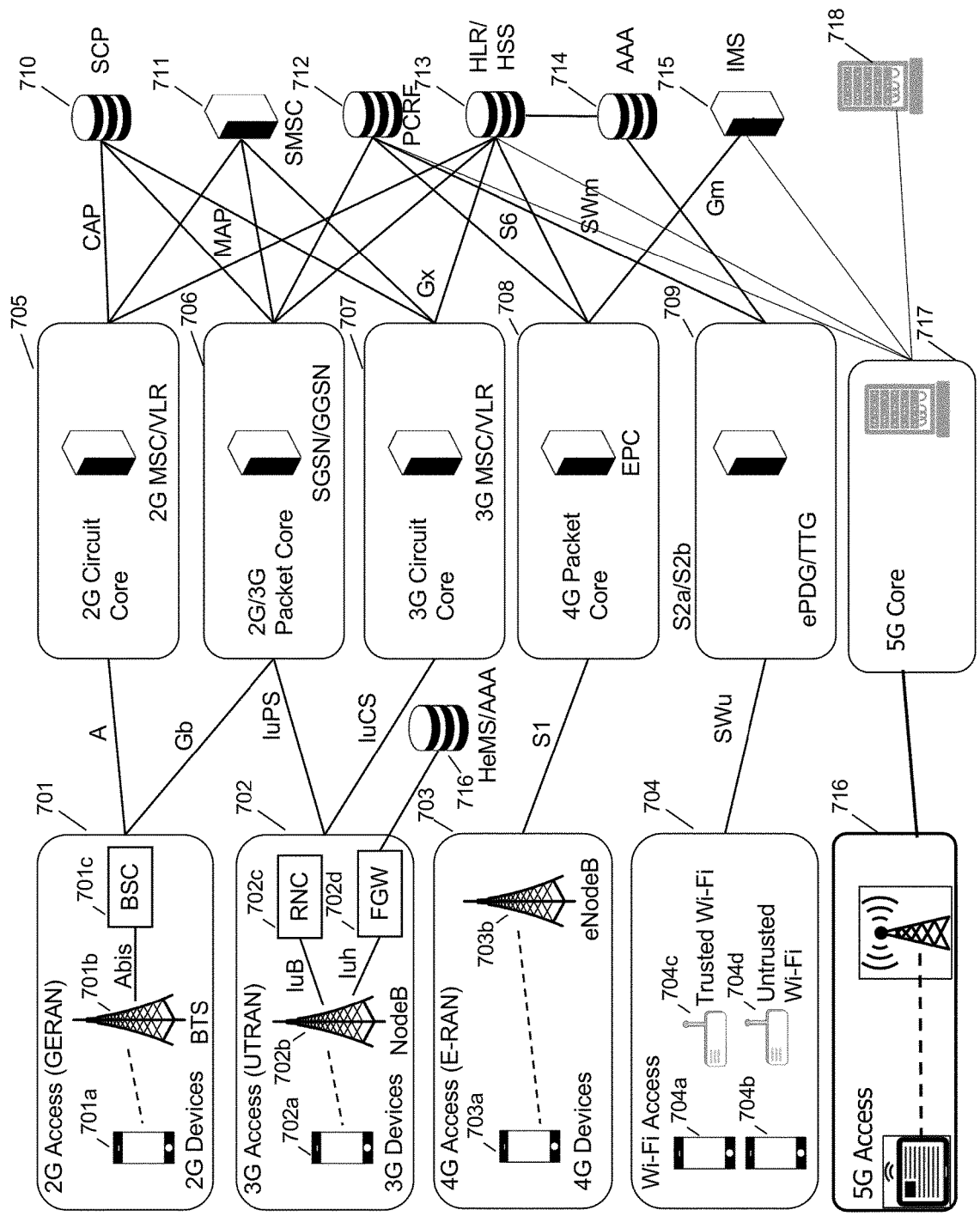
FIG. 7 is a network diagram, in accordance with some embodiments.

FIG. 7 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 101a, BTS 101b, and BSC 101c. 3G is represented by UTRAN 102, which includes a 3G UE 102a, nodeB 102b, RNC 102c, and femto gateway (FGW, which in 3GPP namespace is also known as a Home nodeB Gateway or HNBGW) 102d. 4G is represented by EUTRAN or E-RAN 103, which includes an LTE UE 103a and LTE eNodeB 103b. Wi-Fi is represented by Wi-Fi access network 104, which includes a trusted Wi-Fi access point 104c and an untrusted Wi-Fi access point 104d. The Wi-Fi devices 104a and 104b may access either AP 104c or 104d. In the current network architecture, each "G" has a core network. 2G circuit core network 105 includes a 2G MSC/VLR; 2G/3G packet core network 106 includes an SGSN/GGSN (for EDGE or UMTS packet traffic); 3G circuit core 107 includes a 3G MSC/VLR; 4G circuit core 108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 130, the SMSC 131, PCRF 132, HLR/HSS 133, Authentication, Authorization, and Accounting server (AAA) 134, and IP Multimedia Subsystem (IMS) 135. An HeMS/AAA 136 is present in some cases for use by the 3G UTRAN. The diagram is used to indicate schematically the basic functions of each network as known to one of skill in the art, and is not intended to be exhaustive. For example, 5G core 117 is shown using a single interface to 5G access 116, although in some cases 5G access can be supported using dual connectivity or via a non-standalone deployment architecture.

Noteworthy is that the RANs 101, 102, 103, 104 and 136 rely on specialized core networks 105, 106, 107, 108, 109, 137 but share essential management databases 130, 131, 132, 133, 134, 135, 138. More specifically, for the 2G GERAN, a BSC 101c is required for Abis compatibility with BTS 101b, while for the 3G UTRAN, an RNC 102c is required for Iub compatibility and an FGW 102d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection. Where gNB is used herein, a 5G base station (gNodeB) having is intended to be identified. A 5G gNB having 5G new radio (NR) is specifically intended to use this invention. Where CN is described, a 5G core network is intended to be identified. In some embodiments, a 5G deployment having a mixture of 4G and 5G networks can use the present invention. The 5G network may be a 5G SA network, 5G NSA network, or a mix thereof, in some embodiments, with the specific CN being referred to herein being a 5G SA that is part of a mixed 5G network. In one case, processing will happen at gNB and in another case it is in UE. A 5G RNA update is described, in some embodiments.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
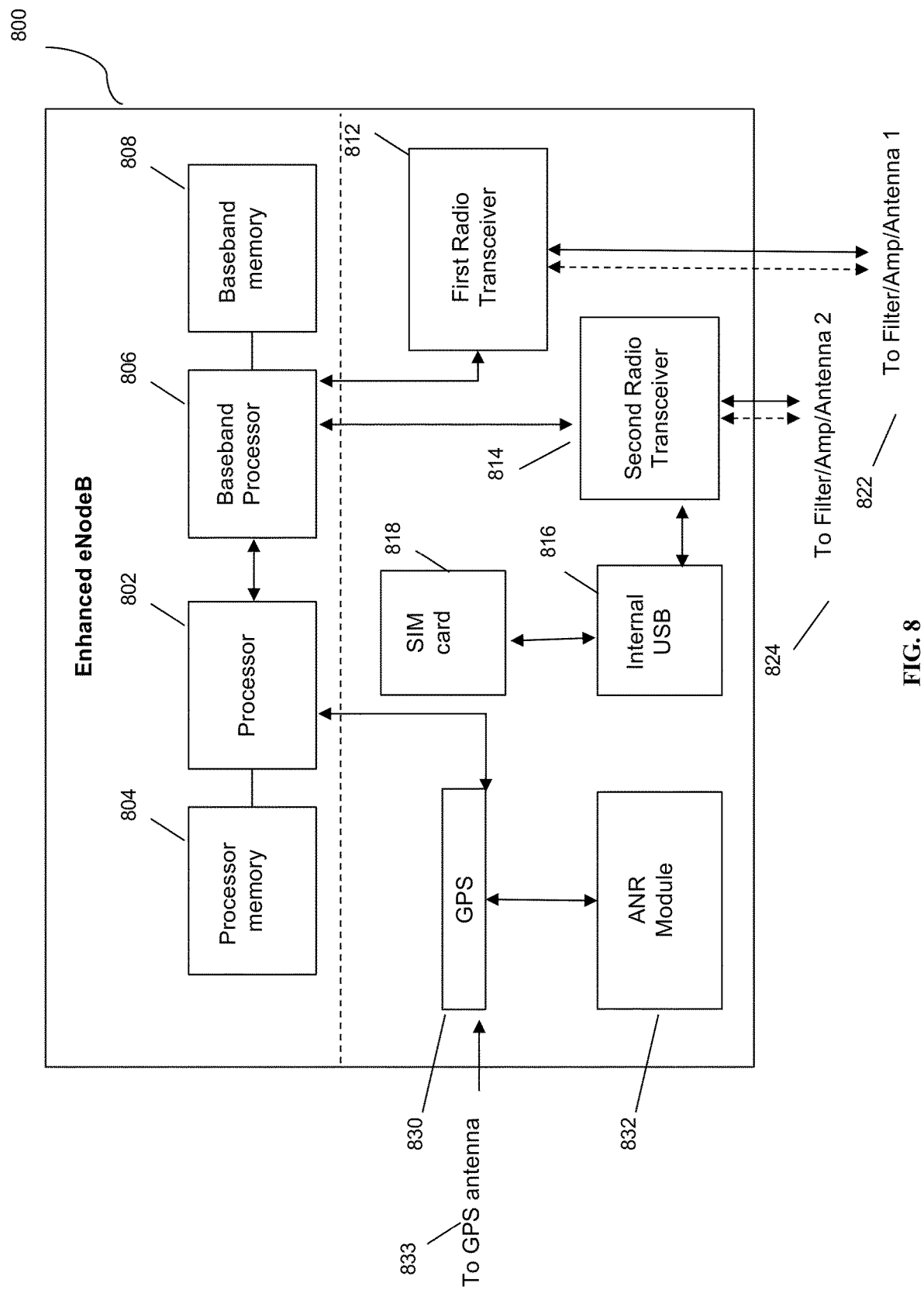
FIG. 8 is an enhanced eNodeB for performing the methods described herein, in accordance with some embodiments.

FIG. 8 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
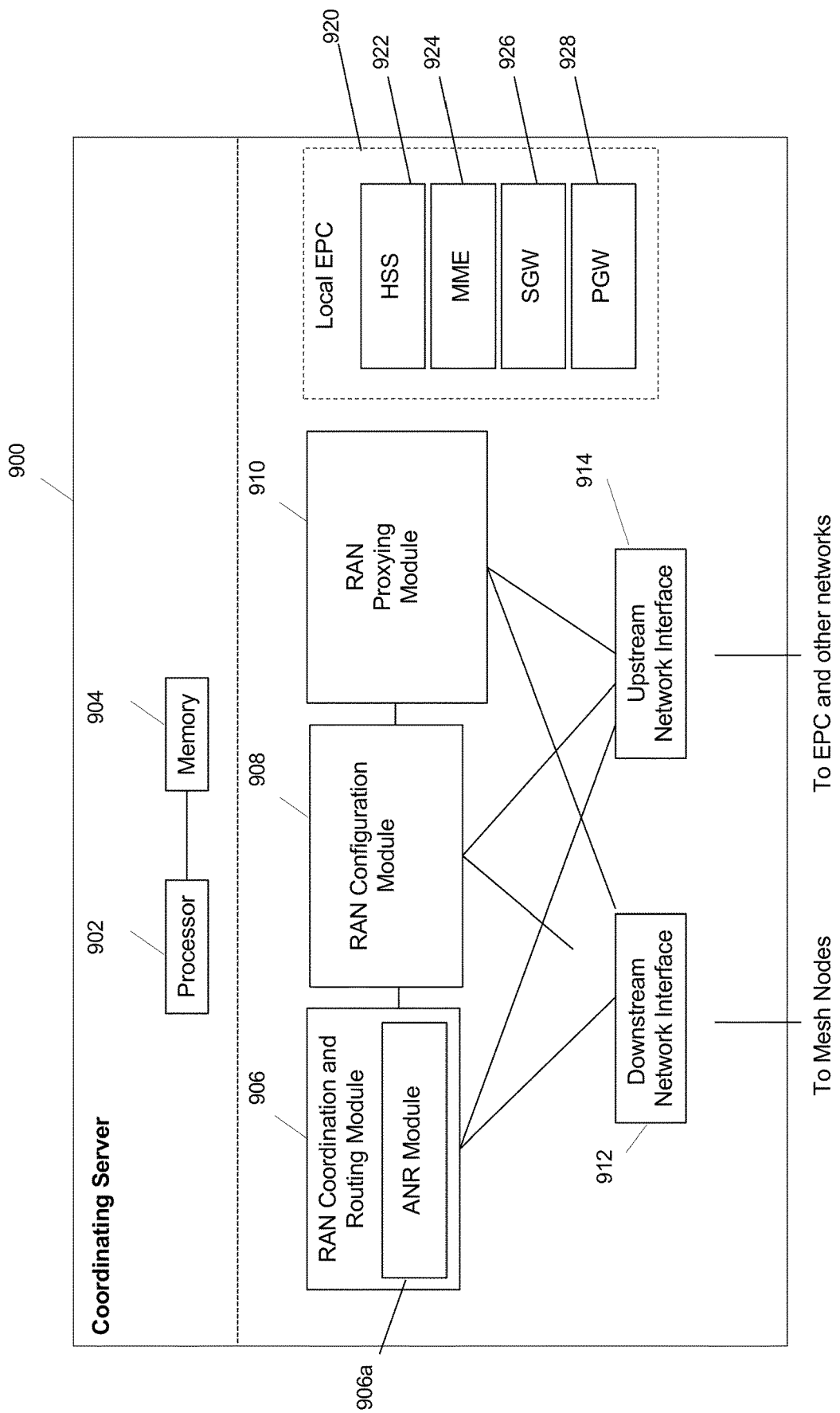
FIG. 9 is a coordinating server for providing services and performing methods as described herein, in accordance with some embodiments.

FIG. 9 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for processing a paging request in a wireless network system, comprising:
   receiving, from a User Equipment (UE), a Physical Random Access Channel (PRACH) preamble;
   sending, to the UE, a paging request;
   sending, to the UE, a Random Access Response;
   receiving, from the UE, a response with the response having a cause labeled as a paging response in place of an Radio Area Network (RAN)-based Notification Area (RNA) update response;
   sending, to the UE, an RRCResume message;
   receiving, from the UE, an RRCResume Complete message; and
   receiving, from the UE, a paging response, further comprising when the RRCResume request is received from the UE before transmission of the paging request, storing a paging message and processing the paging message after completion of an Radio Area Network (RAN)-based Notification Area (RNA) update.

2. The method of claim 1 wherein the response comprises a RRCResumeRequest.

3. The method of claim 1 further comprising restarting all timers related to the RNA update after sending the response.

4. The method of claim 1 wherein an RNA update is not received.

5. The method of claim 1 wherein the UE is communicating with a gNB.

6. The method of claim 1, further comprising:
   receiving, from the UE, a response with the response having a cause labeled as a paging response in place of a Radio Area Network (RAN)-based Notification Area (RNA) update response.

7. The method of claim 6 wherein the response comprises a RRCResumeRequest.

8. The method of claim 6 wherein the UE is communicating with a gNB.

9. The method of claim 8 further comprising storing the paging message by the gNB in place of forwarding the paging message to the UE if an RRC timer is about to expire.

10. The method of claim 9 further comprising sending a paging failure message after the RNA update is complete.

11. The method of claim 6 further comprising when a timer for a periodic RNA update is about to expire, storing by a gNB a paging message and processing the paging message after completion of the periodic RNA update.

12. The method of claim 6 further comprising when the RRCResume request is received before transmission of the paging request, storing by the gNB the paging message and processing the paging message after completion of the RNA update.

13. A system for providing paging optimization, comprising:
   a User Equipment (UE);
   a gNB in communication with the UE; and
   a core network in communication with the gNB; wherein when an RRCResume request is received by the gNB from the UE before transmission of a paging request, the gNB stores a paging message and processes the paging message after completion of an Radio Area Network (RAN)-based Notification Area (RNA) update.

* * * * *